US011174973B2

(12) United States Patent
Jeltsch et al.

(10) Patent No.: US 11,174,973 B2
(45) Date of Patent: Nov. 16, 2021

(54) CONNECTION DEVICE

(71) Applicant: EMS-PATENT AG, Domat/Ems (CH)

(72) Inventors: Thomas Jeltsch, Domat/Ems (CH); Patrick Schmid, Mels (CH); Ming Jiann Cheung, Jiangsu (CN)

(73) Assignee: EMS-PATENT AG, Domat/Ems (CH)

( * ) Notice: Subject to any disclaimer, the term of this patent is extended or adjusted under 35 U.S.C. 154(b) by 513 days.

(21) Appl. No.: 16/073,664

(22) PCT Filed: Feb. 10, 2016

(86) PCT No.: PCT/EP2016/052845
§ 371 (c)(1),
(2) Date: Jul. 27, 2018

(87) PCT Pub. No.: WO2017/137077
PCT Pub. Date: Aug. 17, 2017

(65) Prior Publication Data
US 2019/0040985 A1 Feb. 7, 2019

(51) Int. Cl.
*F16L 37/14* (2006.01)
(52) U.S. Cl.
CPC .................. *F16L 37/148* (2013.01)
(58) Field of Classification Search
CPC ....... F16L 37/148; F16L 37/14; F16L 37/144; F16L 37/091; F16L 37/24; F16L 37/107
(Continued)

(56) References Cited

U.S. PATENT DOCUMENTS 3,606,402 A * 9/1971 Medney ................ F16L 37/148
285/305
4,697,947 A * 10/1987 Bauer .................... E21B 17/046
403/14
(Continued)

FOREIGN PATENT DOCUMENTS

DE 10048323 7/2001
DE 202009013477 U1 * 2/2011 ............ F16L 37/148
(Continued)

OTHER PUBLICATIONS

PCT Search Report and IPER issued in PCT/EP2016/052845.
Japanese Office Action (with English translation) issued in 2018-541644.

*Primary Examiner* — Matthew Troutman
*Assistant Examiner* — Fannie C Kee
(74) *Attorney, Agent, or Firm* — Greenblum & Bernstein, P.L.C.

(57) ABSTRACT

A connection device for at least one plug-in portion including an annular external groove includes a housing, into which at least one plug-in portion can be plugged, and also at least in each case one integral locking element and a securing device. A locking element includes a securing portion and a locking portion which can be preassembled in the housing. In the preassembled state, the locking portion, by elastic deflection, permits a plug-in portion to be plugged into the housing and brings about the locking of the plug-in portion in the housing. By means of the securing device, the securing portion can be secured on an outer side of the housing opening against displacement in a circumferential direction. A securing device is designed as a ring which engages around the housing and is movable on the housing at least axially counter to a resistance and has an axial recess in a plugging-in direction. A cam arranged on the securing portion of the locking element engages in the recess, as a (Continued)

result of which displacement of the locking element in relation to the securing device is prevented.

15 Claims, 4 Drawing Sheets

(58) Field of Classification Search
USPC .............................................. 285/80–81, 91
See application file for complete search history.

(56) References Cited

U.S. PATENT DOCUMENTS

| 6,179,347 | B1 | 1/2001 | Dole |
| 2007/0246936 | A1 | 10/2007 | Jeltsch |
| 2012/0280489 | A1 | 11/2012 | Bundy |

FOREIGN PATENT DOCUMENTS

| DE | 102011006097 | 9/2012 |
| EP | 1 845 299 | 10/2007 |
| JP | S57-156689 | 10/1982 |
| JP | H7-332562 | 12/1995 |
| WO | 2011/060967 | 5/2011 |

\* cited by examiner

CONNECTION DEVICE

BACKGROUND

(1) Field of the Invention

The present invention relates to a connection device for at least one plug-in portion, comprising a ring-shaped outer groove, of a hose-shaped or tubular line or a nozzle or a molded body. The connection device comprises a housing, into which a corresponding plug-in section is pluggable, and a flexible locking element, which is pre-installable in a ring-shaped inner groove formed in the housing. The flexible locking element enables the plugging of a plug-in section into the housing in the preinstalled state with elastic deflection, wherein the locking element latches in the outer groove of the plug-in section. The locking element is secured in the installed state against a displacement in the inner groove circumferential direction.

(2) Description of the Background

A connection device of the type in question is known from WO 2011/060967 A1. The securing of the locking element at least against a displacement in the withdrawal direction takes place here by means of a securing apparatus arranged adjacent to the opening to the inner groove externally on the housing, which comprises an outer stop and preferably a receptacle pocket, which contains the outer stop and is arranged externally on the housing, and into which the outwardly protruding end of the locking element is plugged.

The connection device described in WO 2011/060967 A1 is a refinement of the connection device described in patent EP 1 845 299 B1 for a pipe by way of plugging into a housing. In the connection device described in EP 1 845 299 B1, a flexible locking element, which is pre-installable in a ring-shaped inner groove of the housing, is firstly secured against undesired tangential movement and/or against gradually rotating out, for example, by vibrations, by forming the inner groove and/or the opening thereof in the housing with at least one stop and the locking element with at least one latch lug or latching at the opening to the ring groove in the housing.

In U.S. Pat. No. 6,179,347 B1 for a pipe coupling, a locking element, which is pre-installable in a ring-shaped inner groove of a housing, having strip-shaped main body and spring-like fingers for latching in a ring-shaped outer groove of the plug-in section of a pipe end is also described. This flexible locking element is not secured against undesired movement in the groove, however. The locking element shown as prior art in FIG. 2 of U.S. Pat. No. 6,179,347 B1 does have a securing element formed as a separate screw-on cap, but the relevant locking element in the form of a round cable can only be inserted after the two pipe ends are plugged together.

SUMMARY

The object of the present invention is, for a connection device of the type in question, to provide an alternative securing apparatus for the locking element, which functions rapidly and simply and does not require tools.

This object is achieved according to the invention as claimed.

A connection device according to the invention for at least one plug-in portion, comprising a ring-shaped outer groove, of a hose-shaped or tubular line, a tubular nozzle, or a molded body, comprises:

a) a housing, into which the at least one plug-in portion is pluggable in a plug-in direction,
b) at least one integral locking element, which comprises a locking portion in the form of an open ring and a securing portion, wherein each locking portion is pre-installable in a ring-shaped inner groove formed in the housing and, in the preinstalled state with elastic deflection, enables the plugging of a plug-in portion into the housing, by the plug-in portion engaging in the inner groove of the housing and latching in the outer groove of the plug-in portion, and wherein each of the locking portions are insertable into these grooves and can be withdrawn from these grooves through an associated housing opening essentially in a circumferential direction,
c) at least one securing apparatus, by means of which the securing portion is securable on an outer side of the housing opening and therefore the locking portion of a locking element connected to the securing portion is securable against a displacement in the circumferential direction,
wherein at least one of the securing apparatuses is formed as a ring, which encloses the housing and is movable on this housing at least axially against a resistance, and which has an axial recess in the plug-in direction, which is designed for the engagement of an essentially radially protruding cam arranged on the securing portion of the locking element, wherein this engagement prevents a displacement of the locking element in relation to the securing apparatus, both in the preinstalled state and also after the plugging of a plug-in section into the housing, in a circumferential direction.

During the initial insertion of a new locking element, it is generally laid with its locking portion by hand in the inner groove of the housing and therefore preinstalled in this manner.

The expression "ring-shaped" preferably means "circular" in the present invention. "Circular" means, in reference to the housing, the plug-in portion, and the securing apparatus, a cross-sectional geometry based on a circular shape. However, a circular geometry is not absolutely necessary. In principle, a cross-sectional shape adapted to one another for the plug-in portion and the housing having noncircular, for example, elliptical cross section is also possible for the plug-in portion and the housing in the scope of the invention. A noncircular cross section corresponding to one another would be a possible variant of a form fit, to suppress a pivot of the plug-in portion in relation to the housing. With this type of pivot securing, the ring-shaped securing apparatus would also have a corresponding, noncircular form and would therefore not be rotatable. In a further possible variant, the securing apparatus can nonetheless be made rotatable, even if the plug-in portion is embodied as non-circular and the inner contour of the housing is embodied as noncircular and adapted to the plug-in portion. This applies if the outer contour of the housing is formed circular to enable a circular securing apparatus having rotational capability. Even with a noncircular cross section, the locking portion of the locking element still has to be insertable through an assigned housing opening into the mentioned grooves and has to be able to be withdrawn from these grooves, because of which the deviation from a circular geometry cannot be excessively strong.

Preferred embodiments of the connection device are explained both directly hereafter and also farther below in conjunction with the figures.

In the connection device according to the invention, the housing opening is preferably formed as an inlet window adapted to a cross-sectional shape and an inclination of the locking portion in relation to the plug-in direction. A geometrically matching feedthrough of the locking portion through the housing opening is thus achieved, because the locking portion is inclined obliquely and/or conically inward either as a whole or at least with its spring-like fingers or teeth for latching in the outer groove of a plug-in portion.

Suitable design options for locking portions are known from the prior art cited at the outset. One particular embodiment of a locking element or locking portion is illustrated in WO 2011/060967 A1 in FIGS. 4, 10, and 11. A locking portion thus formed is also usable in the present invention. Other possible variants will be explained hereafter.

The securing apparatus formed as a ring is preferably formed as a closed ring, which means that such a ring has at least one region which is closed over the entire circumference. This closed region can vary in its diameter and/or in its axial location viewed over the circumference (for example, in a meandering manner) and does not have to have a constant cross section. In other words, "closed" means that the ring is coherent all around with respect to material and is not severed completely anywhere. The width and the thickness of the ring do not have to be equal everywhere in this case. In one preferred embodiment, the securing apparatus formed as a ring is closed (i.e., continuous) on the side facing away from the plug-in direction, while it is interrupted on the other side by the axial recess for the cam arranged on the securing portion of the locking element. In another preferred embodiment, the securing apparatus formed as a ring is embodied so that a recess for the cam of the locking element is located on the inner side of the ring, and the recess does not extend up to the outer side of the ring. The ring would then be thicker than the height of the cam at least at this point. In the latter embodiment, the cam would not be externally visible, but would be protected from external influences.

The securing apparatus formed as a ring can be a non-closed ring in a further embodiment. Such a non-closed, i.e., open ring is entirely interrupted at one position. A sufficient intrinsic stability can also be ensured in an open ring by corresponding selection of material and/or design. Such an open ring can have a continuous axial gap, for example, at the point where the axial recess is. The axial recess or the axial gap is formed in this first variant for the engagement with the cam of the locking element. In a second variant of a securing apparatus formed as an open ring, the interruption of the ring can be arranged at a different point than the axial recess for the cam. In this second variant, it would be possible, as already explained in the case of the closed embodiment, to also form the axial recess such that it extends up to the outer side of the ring or not. The width of the interruption in the ring would moreover be independent of the width of the axial recess in this second variant, wherein the axial recess in this second variant is to be formed so that it does not result in a second interruption of the ring.

The connection device according to the invention is preferably designed so that the securing apparatus, after the axial attachment on the housing, is moreover rotatable on the housing in its circumferential direction and is designed to drive the cam in the axial recess in the circumferential direction.

In one preferred embodiment of a connection device having rotatable securing apparatus, the latter is formed for rotating open and withdrawing the locking portion of the locking element from the housing opening, from the inner groove of the housing, and from the outer groove opposite thereto of the plug-in portion by means of rotation in a corresponding circumferential direction. The withdrawal of the locking element is preferably secured against an initial resistance.

In one preferred embodiment of an attachment device having rotatable securing apparatus, the securing apparatus is additionally designed for turning closed and for reinserting the locking portion of the locking element in the housing opening and in the inner groove of the housing or for inserting the locking portion of the locking element into the housing opening, into the inner groove of the housing, and into the outer groove opposite thereto of an inserted plug-in portion by means of rotation in a corresponding circumferential direction.

Because the locking element is covered by the attached ring-shaped securing apparatus, it is preferable for the user for orientation if it is indicated on the outer side of the securing apparatus, for example, using words and/or arrows and/or other identifiers, in which rotational direction it is opened and in which it is closed. Markings are preferably in turn applied to the housing which indicate, with respect to the cam of the securing portion in the axial recess, whether the locking element is located in the closed or open position or in between.

It is also to be noted that the invention is not restricted to only one locking element per plug-in portion. In special embodiment variants, two or more locking elements can be arranged in succession in a corresponding number of grooves of housing and plug-in portion to increase the axial withdrawal force. The securing apparatus would then secure, in a correspondingly longer axial recess, all locking elements or the cams thereof on the securing portions in parallel and would move them synchronously or essentially synchronously upon rotation.

In the connection device according to the invention, the material for the locking element and/or the securing apparatus is preferably selected from plastics or composite materials. This ensures a sufficient flexibility for the locking element in particular. Plastics, composite materials, ceramics, glass ceramics, glasses, or metals are preferably selected as the material for the housing and/or the plug-in portion. The plastics to be selected for the locking element, the securing apparatus, the housing, and/or the plug-in portion particularly preferably comprise polyamides. The plastics and/or the polyamides preferably contain additives, fillers, and/or reinforcing agents. Polyamides are especially preferably selected from the group comprising polyamide 6, polyamide 66, polyamide 46, polyamide 11, polyamide 12, polyamide elastomers, polyphtalamides, partially-aromatic partially-crystalline co-polyamides, and mixtures of these polyamides.

The following remarks are also to be made with respect to the possible formations located on the plug-in portion:

In the case of a hose-shaped or tubular line, it can be a fluid line for conducting through a fluid as a gas (for example, air), as a vapor, as a liquid, or as a mixture of these phases. The hose-shaped or tubular line can also be formed, however, as a protective tube for cables extending therein and is preferably corrugated in this case.

If it is a tubular nozzle, it can thus be a nozzle arranged on a container. Such a nozzle can be screwed onto the container or welded thereon, for example. In one preferred embodiment, the nozzle is formed, for example, by means of plastic injection molding or blow molding directly onto the container. The container can be, for example, a filter housing. In another embodiment, the container can be, for example, a canister, and the housing can be formed by a closed extension as a closure cap for such a canister or for its nozzle.

A molded body having corresponding plug-in portion is to be understood as an arbitrarily formed part, which can be a solid body or a hollow body or a part formed in another manner. Such a part can be, for example, a closure for the housing or for a system connected to the housing. The system connected to the housing can be a line system. In another embodiment, the housing can be formed in its extension as a container, for example, as a barrel, tank, canister, or as a smaller container or as a can. In this embodiment, a molded body formed as a closure more or less forms the lid for a container formed as the housing extension. Molded bodies can be associated, inter alia, with the industrial field, the construction field, packaging field, or also the residential field. In the latter field, apartment equipment components, for example, lamp components, could preferably be fastened in this manner, in particular a lamp globe (for example, made of glass) having plug-in portion, which could be connected in a corresponding socket on the ceiling in the manner according to the invention, and the socket would be designed as a housing having securing apparatus and locking element according to the invention.

The described connection device according to the invention is preferably used for attaching, connecting, or closing fluid lines in automotive engineering (in particular in the air intake system), in the sanitary field, in air-conditioning systems and ventilation installations, in the industrial and transportation fields (for example, also for fastening the ends of corrugated cable protection tubes), or as fittings and/or mounts in industrial manufacturing methods.

One example of a possible application in an industrial manufacturing method are mounts in the production of rubber gloves. Rubber gloves are produced from natural rubber (natural latex) or from synthetic rubber (for example, synthetic isoprene rubber or nitrile-butadiene rubber or chloroprene rubber or polyvinyl chloride). In this case, artificial hand molds, which usually consist of industrial porcelain (i.e., of a ceramic), are immersed in a liquid rubber material. During this immersion method, the rubber material adheres uniformly to the ceramic mold, so that a rubber film forms on the surface thereof. After the drying and vulcanization in a furnace, the finished elastic glove can be drawn off from the hand molds. Such hand molds can now be formed in an application according to the invention of the present invention as molded bodies having a plug-in portion and can be plugged into a connection device according to the invention. Such ceramic immersion molds according to the invention can pass through the immersion bath (rubber bath and possibly further treatment baths) while fixed with this mount. After the pass, rapid and uncomplicated exchange of the plug-in portions is possible, i.e., hand molds having rubber gloves formed thereon can be rapidly replaced with new ceramic molds for the next pass.

A connection device usable in manifold ways having a refined securing apparatus is thus made available by the present invention, which meets all technical requirements and may be operated easily and also elegantly.

Advantages of the connection device according to the invention comprise:

Simple and rapid installation of all components without tools.

User-friendly securing apparatus in the form of a ring which can be grasped well by the hand.

After the attachment of the securing apparatus, the locking element is protected on the inner side of the securing apparatus and is captive.

In its preferably rotatable embodiment and in cooperation with the cam on the securing portion of the locking element, the securing apparatus enables elegant, rapid, and multiple withdrawal and re-insertion of the locking portion.

In this manner, the locking element (also called a "clip"), is usable multiple times and repeatedly rapidly usable.

The simple handling enables a rapid and repeated change of plug-in portions on the same housing fitting.

In spite of the rapid replaceability, the secure seat of locking element and plug-in portion is respectively ensured in the operating state.

Due to the locking of the components by simple rotational movement and the ability to dispense with tools, simple installation in regions having little space, for example, in portions of an engine compartment which are difficult to access, is possible.

BRIEF DESCRIPTION OF THE DRAWINGS

The connection device according to the invention will be explained in greater detail hereafter on the basis of figures, which show exemplary embodiments, which do not limit the scope of the present invention. In the figures.

DETAILED DESCRIPTION

FIGS. 1 to 9 show details of the connection device according to the invention and a pair of possible variations, which are not to be understood as restrictive, to illustrate the invention by way of example. In the individual figures, corresponding parts are provided with the same reference signs and have the same function, even if this is not described in detail in each case.

Figure 1:
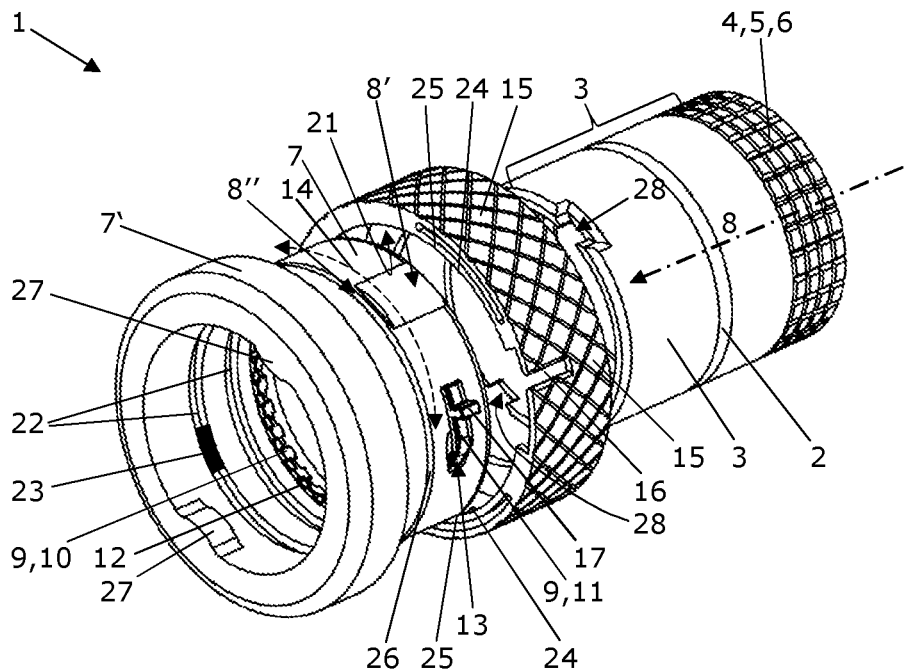
FIG. 1 shows a perspective overall view of a connection device according to the invention in the non-assembled state.
Figure 2:
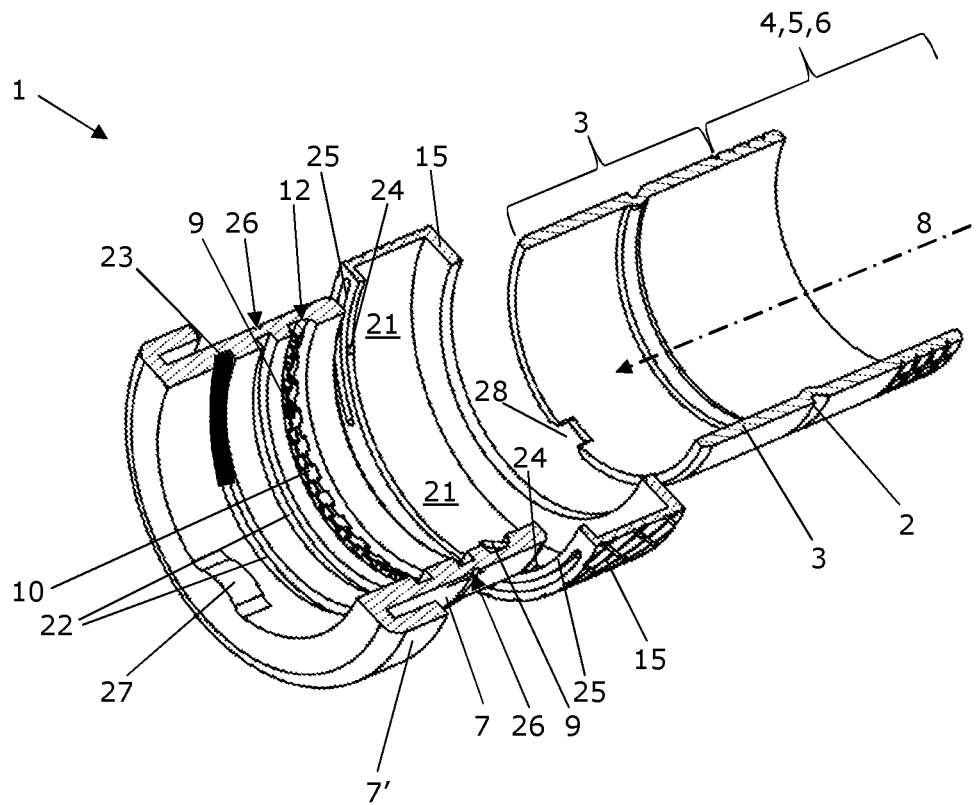
FIG. 2 shows an axial longitudinal section through the connection device of FIG. 1.
Figure 4:
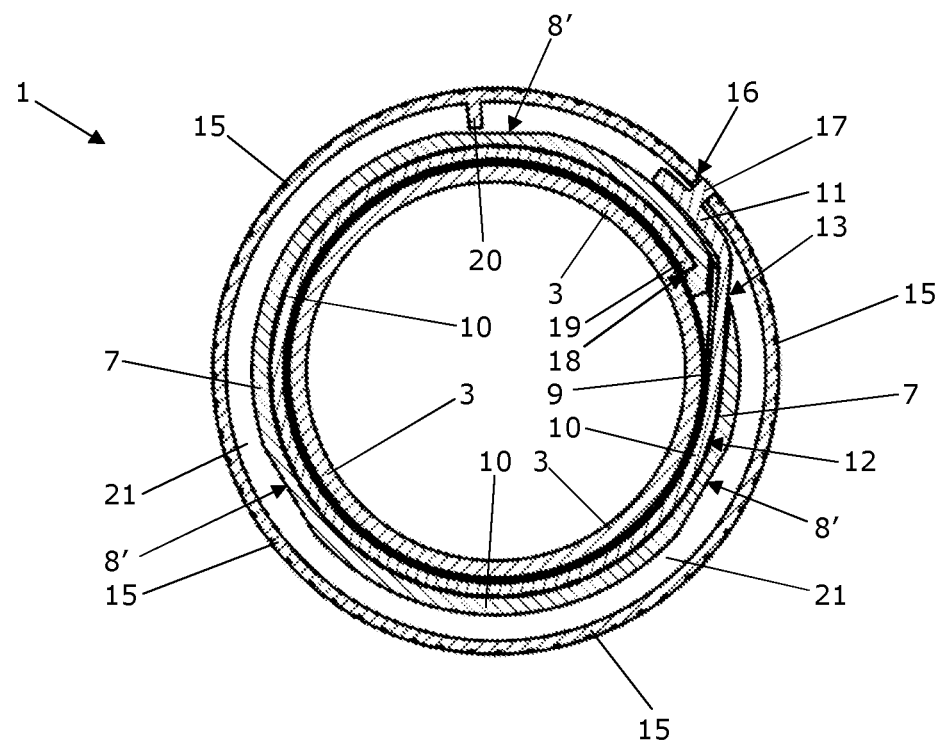
FIG. 4 shows a cross section through an assembled connection device at the height of the locking element.

In the figures FIG. 1 and FIG. 2, essential parts of the connection device 1 according to the invention and also several preferred features are illustrated, as explained hereafter:

The plug-in portion 3, which comprises an outer groove 2, is pluggable into the housing 7 in a plug-in direction 8. The plug-in portion 3 is associated with a hose-shaped or tubular line 4, or a tubular nozzle 5, or a molded body 6. A one-piece locking element 9 or the locking section 10 thereof is preinstalled in a ring-shaped inner groove 12 formed in the housing 7. In the illustrated preinstalled state, the securing portion 11 of the locking element 9 still protrudes through the housing opening 13 on the outer side of the housing 7. The housing 7 generally also has an extension 7', in the form of a collar, for example, in FIG. 1 and FIG. 2. When the plug-in portion 3 is inserted and plugged in the plug-in direction 8 into the housing 7, the locking portion 10 or its region protruding obliquely inward is elastically deflected and then latches in the outer groove 2 of the plug-in portion 3, so that the plug-in portion 3 is locked in the housing 7. Using a securing apparatus 15 in the form of a closed ring shown here, the locking element 9 is then secured against undesired detachment, by moving or pushing the ring-shaped securing apparatus 15 with its axial recess 16 axially over the housing 7 such that it engages at the axial recess 16 with the essentially radially protruding cam 17 of the securing portion 11. The axial pushing on of the securing apparatus takes place against a resistance. The engagement of the cam 17 in the axial recess 16 of the attached securing apparatus 15 prevents a displacement of the locking element 9 in relation to the securing apparatus 15. A space 21, which will be discussed in greater detail in FIG. 4, is formed between an inner side of the attached securing apparatus 15 and an outer side of the housing 7. Moreover, a variant of an open ring for the securing apparatus 15 can also be imagined on the basis of FIG. 1, in which the axial recess 16 extends up to the opposing edge of the ring and thus would form a continuous axial gap.

In one preferred embodiment, the securing apparatus 15 according to the invention has springy attached nubs 24 on its inner side, preferably on at least one spring web 25, which are preferably formed to click into a ring-shaped channel, i.e., a ring groove 26 on the outer side of the housing 7, after overcoming the resistance in the axial direction. The resistance in the axial direction can be implemented, for example, as illustrated in FIG. 1, by a flat part 8' and a protrusion 8", over which a corresponding nub 24 has to slide and has to overcome the protrusion 8". The resistance could also be formed, for example, by a ring-shaped bead.

If the securing apparatus 15 is rotatable in the circumferential direction 14 (as shown in FIG. 1), in this case the rotation is advantageously guided by the nubs 24 attached to spring webs 25 on the inner side of the securing apparatus 15, which preferably slide in the mentioned ring-shaped groove or ring groove 26 (which is circular in this case) on the outer side of the housing 7.

The housing 7 of the connection device 1 according to the invention preferably has at least one additional ring-shaped inner groove 22 for accommodating a seal 23 (for example, an O-ring seal) between the housing 7 and the at least one plug-in portion 3.

In one preferred embodiment, in a connection device 1 according to the invention, the plug-in portion 3 can also be secured against pivoting in relation to the housing 7 with circular cross section. As illustrated in FIG. 1 and FIG. 2, this is preferably implemented by means of at least one positioning cam 27 on the inner side of the housing 7 and corresponding positioning cutouts 28 in the end face of the plug-in portion 3, which interlock when they are joined together in a correctly positioned manner. Two opposing positioning cams 27 and two corresponding positioning cutouts 28 are particularly preferred.

Figure 3:
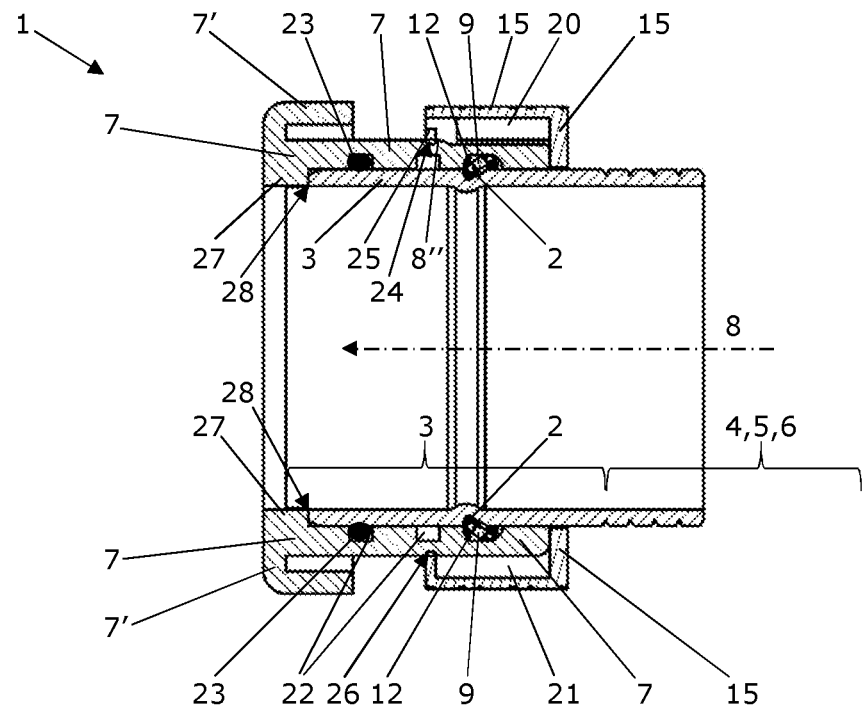
FIG. 3 shows an axial longitudinal section through an assembled connection device.

FIG. 3 shows an axial longitudinal section through a connection device 1 according to the invention in the assembled state. All reference signs already occurred in the explanation of FIG. 1 and FIG. 2, except for the number 20, which identifies an axial web on the inner side of the securing apparatus 15 in FIG. 3, the meaning of which will be explained in greater detail in FIG. 4. The seal 23 and a protrusion 8" on top are well visible in this longitudinal section. In the illustrated preferred embodiment, the latter forms the resistance for a nub 24 attached on the spring web 25 when the securing apparatus 15 is axially pushed on.

As illustrated in FIG. 4, the connection device 1 is preferably designed so that one end 18 of the inner groove 12 is formed as a stop for a tip 19 of the locking portion 10 and therefore as an end point when rotating the securing apparatus 15 closed. The connection device 1 is moreover preferably designed so that an axial web 20 on the inner side of the securing apparatus 15 is arranged as the end stop when rotating open the securing apparatus. At the end stop, the axial web 20 on the outer side of the housing opening 13 presses against the locking portion 10. The position of the axial web is dimensioned so that upon reaching this end stop, the tip 19 of the locking portion 10 still remains in the housing opening 13. A simple reinsertion of the locking portion 10 of the locking element 9 into the housing opening 13 and into the inner groove 12 of the housing 7 or an insertion of the locking portion 10 of the locking element 9 into the housing opening 13, into the inner groove 12 of the housing 7, and into the outer groove 2 opposite thereto of an inserted plug-in portion 3 by rotating closed is thus enabled.

In one advantageous embodiment of this preferred connection device 1, it is conceived for rotating closed and rotating open the ring-shaped securing apparatus 15 multiple times, by this connection device 1 defining a space (well visible in FIG. 4) between an inner side of the securing apparatus 15 and an outer side of the housing 7, in which the locking element 9 remains after each detachment of a plug connection by rotating open the attached securing apparatus 15.

It is moreover well visible in FIG. 4 that the housing opening 13 preferably extends essentially tangentially out of the inner groove 12 in its base alignment.

Figure 5:
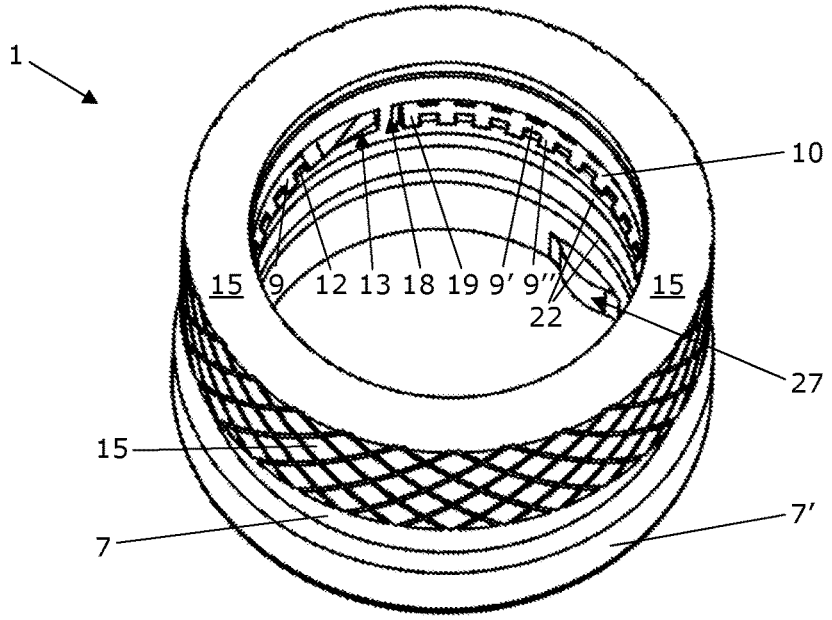
FIG. 5 shows a perspective view of the connection device having preinstalled locking element and securing apparatus without plug-in portion.

A locking element 9 preinstalled in an inner groove 12 is well visible in FIG. 5. This locking element 9, which is also shown once again separately hereafter in FIG. 6A, FIG. 6B, and FIG. 6C, has in this embodiment a continuous strip-shaped core 9' having double teeth 9" in the locking portion 10. Moreover, a positioning cam 27 is visible.

Figure 6A:
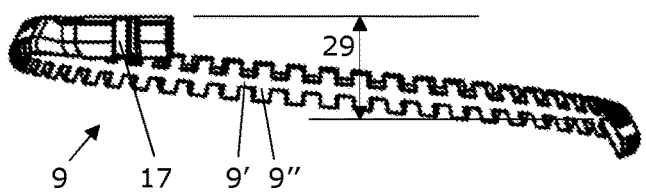
FIG. 6A shows a side view of a locking element having helical pitch of the locking portion in double-tooth embodiment.
Figure 6B:
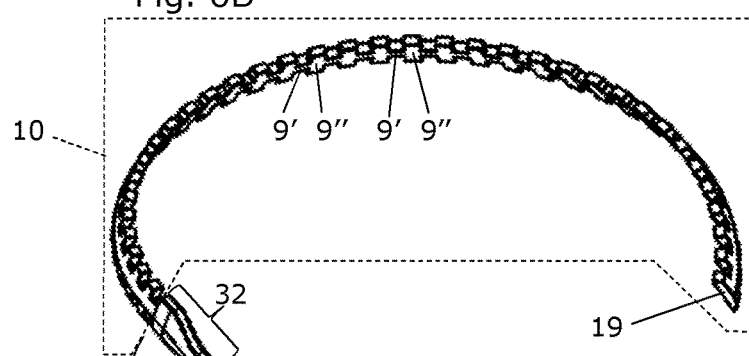
FIG. 6B shows a perspective view of the locking element of FIG. 6A.

FIG. 6A and FIG. 6B: In one advantageous embodiment of the connection device 1, the locking portion 10 of the locking element 9 has a helical pitch 29 in the non-installed, tension-less state. This means the open ring of the locking portion 10 is preformed in this preferred variant with a coiled pitch. This is used for counter compensation in the alignment of the locking portion 10 during its intake movement into the inner groove 12 during the rotation closing of the securing apparatus 15. This preferred helical embodiment of the locking portion 10 enables the locking portion 10 to run accurately in the inner groove 12 of the housing 7 even if the plug-in portion 3 is not yet present as the securing apparatus 15 is rotated closed. Thus, after a removal of a plug-in portion 3, the locking element 9 can be moved rapidly back into a preinstalled position by simply rotating the securing apparatus 15 closed, and a new plug-in portion 3 can subsequently be plugged in and latches with its outer groove 2 on the locking portion 10. Alternatively to the helical pitch 29 or in combination with the latter, to achieve this advantageous effect, the locking element 9 can have a rotating portion 32, which is bent or buckled, in the securing portion 11 toward the locking portion 10. The locking portion 10 is framed by dashed lines in FIG. 6B.

Figure 6C:
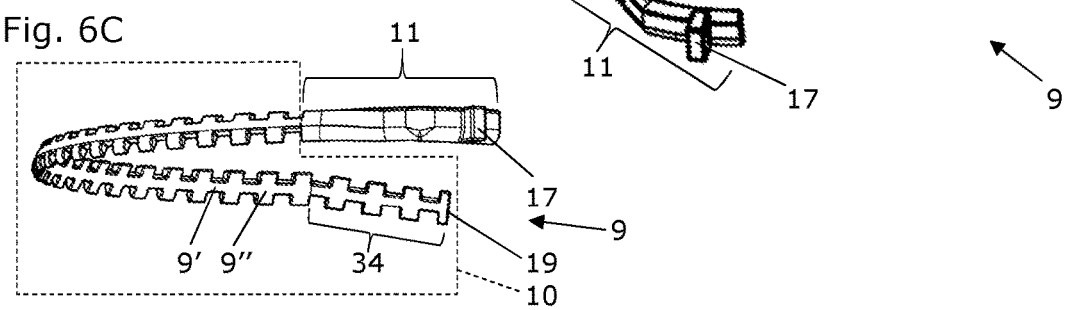
FIG. 6C shows a perspective side view of a locking element having a locking portion bent or buckled in the region of the tip.

A further alternative for achieving the advantageous effect explained in the previous paragraph is illustrated in FIG. 6C, where the locking portion 10 is also framed by dashed lines. FIG. 6C shows a perspective side view of a locking element 9 having a bent or buckled region 34 at the tip 19 of the locking portion 10, wherein the bending or curvature points in the same direction as would be the case with a helix shape having a helical pitch 29. This variant is also possible alone or in combination with the other described variants.

Locking elements 9 or locking portions 10 without helical preforming 29 and/or without bent or buckled rotating portion 32 and/or without a bent or buckled region 34 can also be used per se in the connection device 1 according to the invention. However, the use thereof is linked to the restriction that a simple preinstallation by rotating closed the securing apparatus 15 is not possible in all cases without an inserted plug-in portion 3. It is then generally necessary, to join together the connection, to firstly insert a new plug-in portion 3 into the housing, so that a closed ring-shaped channel is formed from the inner groove 12 of the housing 7 and the outer groove 2 of the plug-in portion 3 opposite thereto. Such a locking portion 10 extends in this channel during the subsequent rotating closed of the securing apparatus 15, guided by the spatial delimitation of the two groups 2 and 12, in the correct path and not adjacent thereto.

Figure 7A:
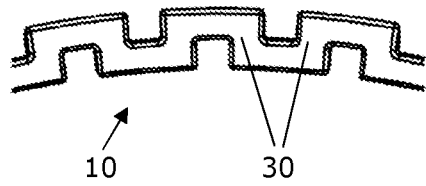
FIG. 7A shows a detail of a locking portion having rectangular meandering.
Figure 7B:
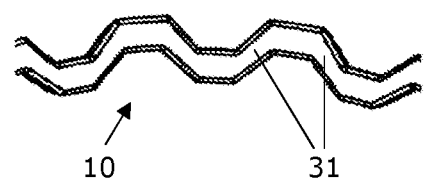
FIG. 7B shows a detail of a locking portion having elongated meandering.

FIG. 7A and FIG. 7B: A locking portion 10 can also be formed according to the concept of meandering instead of a strip-shaped core 9 having spring-like fingers or teeth 9" formed thereon. In the concept of meandering, it is no longer possible to differentiate between a continuous strip and teeth, but rather the locking portion is then formed in a meandering manner. The elastic deflection of such a locking portion 10 takes place by torsion of the entire locking portion per se. FIG. 7A shows a detail of a locking portion 10 having rectangular meandering 30. FIG. 7B shows a detail of a locking portion 10 having elongated meandering 31. Alternatively, however, a locking portion 10 could be constructed from alternating segments of both concepts.

Figure 8A:
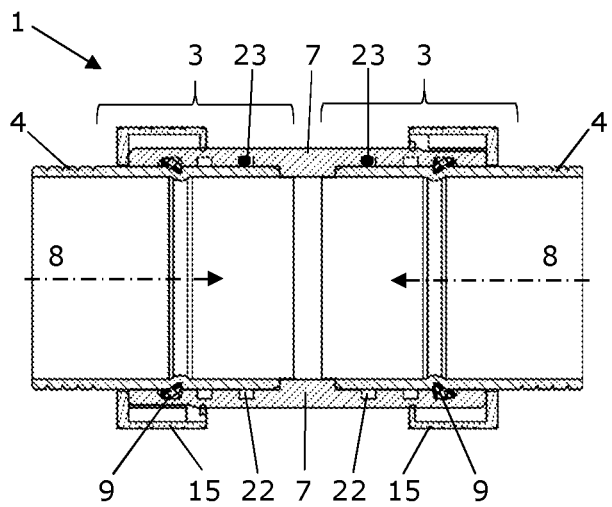
FIG. 8A shows an axial longitudinal section through a connection device having two opposing plugged-in plug-in portions.
Figure 8B:
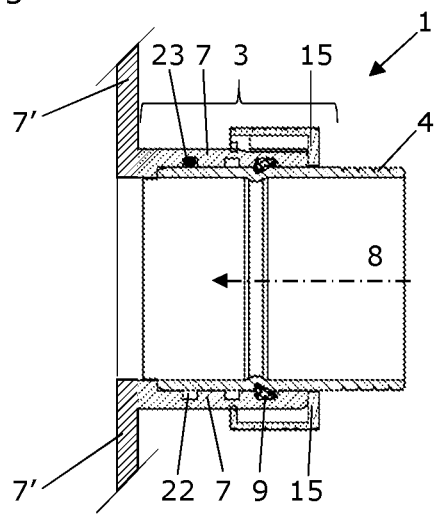
FIG. 8B shows an axial longitudinal section through a connection device having an extension on the housing in the form of a wall.
Figure 9:
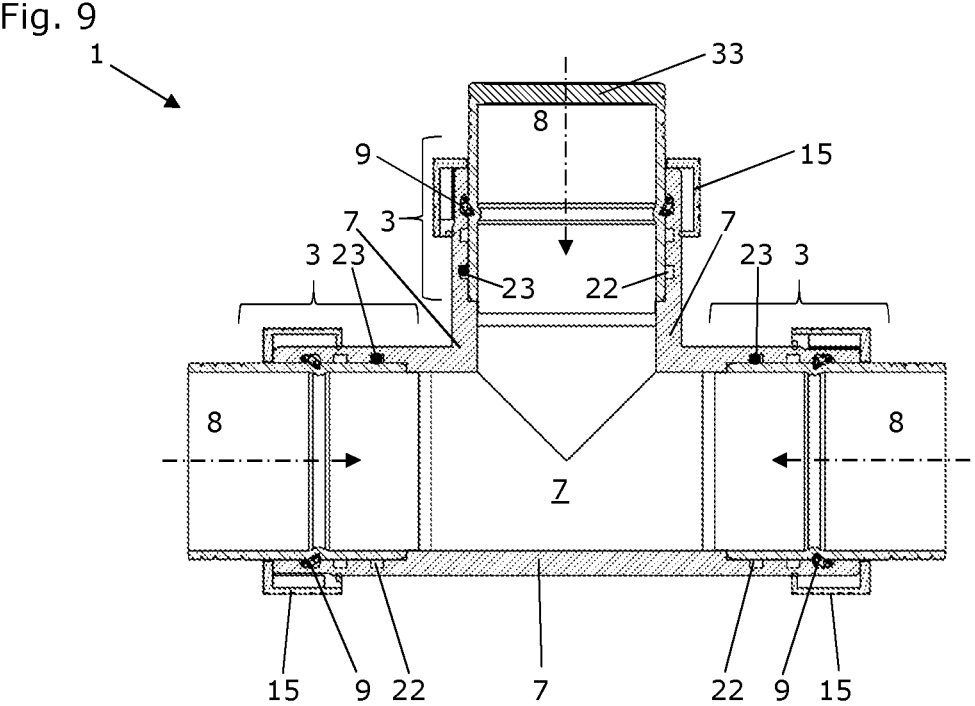
FIG. 9 shows an axial longitudinal section through a connection device embodied as a T-piece having three plugged-in plug-in portions and a molded body formed as a closure.

FIG. 8A, FIG. 8B, and FIG. 9: The housing 7 of the connection device 1 according to the invention is preferably designed to accommodate precisely one or two or more plug-in portions 3. In one preferred embodiment, the housing 7 of the connection device 1 according to the invention is designed as illustrated in FIG. 8A as a double-sided connecting part for accommodating two opposing plug-in portions 3 on both sides. This would be, for example, a coupling for connecting two pipe ends of two tubular lines 4.

FIG. 8B shows a housing 7 having precisely one plug-in portion 3, wherein the extension 7' of the housing 7 represents a wall. The latter could be, for example, the wall of a large container, on which a hose-shaped or tubular line 4 is connected using the plug-in portion 3.

In other advantageous embodiments, the housing 7 of the connection device 1 according to the invention is formed as a T-piece or as a multiple fitting. A corresponding T-piece is illustrated in FIG. 9, with the additional variant that the third fitting is closed using a closure 33, as an example of a possible molded body 6.

LIST OF REFERENCE NUMERALS

1 connection device
2 outer groove (of plug-in portion 3)
3 plug-in portion
4 line
5 nozzle
6 molded body
7 housing
7' extension of 7
8 plug-in direction
8' flat part
8" protrusion
9 locking element
9' strip-shaped core of 10
9" double teeth of 10
10 locking portion of 9
11 securing portion of 9
12 inner groove (in the housing 7)
13 housing opening
14 circumferential direction
15 securing apparatus
16 axial recess
17 cam of 11
18 end of the inner groove 12
19 tip of 10
20 axial web
21 space
22 additional inner groove
23 seal
24 nub
25 spring web
26 ring groove
27 positioning cam
28 positioning cutout
29 helical pitch of 10
30 rectangular meandering of 10
31 elongated meandering of 10
32 rotating portion of 11
32 closure (example of 6)
34 bent or buckled region of 10 at the tip 19

The invention claimed is:

1. A connection device for at least one plug-in portion that includes at least one ring-shaped outer groove of a hose-shaped or tubular line, a tubular nozzle, or a molded body, wherein the connection device comprises:

a) a housing, into which the at least one plug-in portion is pluggable in a plug-in direction, b) at least one integral locking element comprising a locking portion in the form of an open ring and a securing portion, wherein the locking portion is preinstallable in a ring-shaped inner groove formed in the housing and, in the preinstalled state with elastic deflection, enables the plugging of the at least one plug-in portion into the housing and causes interlocking of the at least one plug-in portion in the housing by the locking portion engaging in the inner groove of the housing and latching in the outer groove of the at least one plug-in portion, and wherein the locking portion is insertable essentially circumferentially through an associated housing opening into the inner and outer grooves and can be withdrawn from these grooves, c) at least one securing apparatus configured to cooperate with the at least one integral locking element by securing the securing portion on an outer side of the housing opening and thus the locking portion of the at least one locking element, connected to the securing portion, can be secured against a displacement in the circumferential direction, wherein the at least one securing apparatus has a ring shape, which encloses the housing and is movable on the housing at least axially against a resistance, and which has an axially extending recess in the plug-in direction, which is formed to engage an essentially radially protruding cam arranged on the securing portion of the at least one locking element, wherein this engagement prevents a displacement of the at least one locking element in relation to the at least one securing apparatus, both in the preinstalled state and also after the plugging of the at least one plug-in portion into the housing, in the circumferential direction, wherein the at least one securing apparatus has an inner side with nubs attached to at least one spring web, which are configured to click into a ring groove on the outer side of the housing after overcoming the resistance in an axial direction; and wherein the at least one securing apparatus, after an axial attachment on the housing, is additionally designed as rotatable on the housing circumferentially and is designed to drive the cam in the axial recess circumferentially.

2. The connection device according to claim 1, wherein the at least one securing apparatus is designed for rotating open and for withdrawing the locking portion of the at least one locking element from the housing opening, from the inner groove of the housing and from the outer groove of the at least one plug-in portion opposite thereto by means of rotation in a corresponding circumferential direction, wherein the withdrawal of the at least one locking element is secured against an initial resistance.

3. The connection device according to claim 2, wherein an axial web is arranged on an inner side of the at least one securing apparatus as an end stop during an open rotation of the at least one securing apparatus, wherein a position of the axial web is measured such that upon reaching this end stop, a tip of the locking portion still remains in the housing opening.

4. The connection device according to claim 2, wherein the connection device is designed for rotating closed and rotating open the ring-shaped securing apparatus multiple times, by this connection device defining a space between an inner side of the ring-shaped securing apparatus and an outer side of the housing, in which the at least one locking element remains after each detachment of a plug-in connection by rotating open the attached securing apparatus.

5. The connection device according to claim 1, wherein the at least one securing apparatus is designed for rotating closed and for reinsertion of the locking portion of the at least one locking element into the housing opening and into the inner groove of the housing or for insertion of the locking portion of the at least one locking element into the housing opening, into the inner groove of the housing and into the outer groove opposite thereto of an inserted plug-in portion by means of rotation in a corresponding circumferential direction.

6. The connection device according to claim 5, wherein one end of the inner groove is formed as a stop for a tip of the locking portion and thus as an end point during the closed rotation of the at least one securing apparatus.

7. The connection device according to claim 1, wherein the housing opening is formed as an intake window aligned to a cross-sectional shape and an inclination of the locking portion in relation to the plug-in direction.

8. The connection device according to claim 1, wherein the locking portion of the at least one locking element has a helical pitch in the non-installed, tension-less state and/or the at least one locking element has a bent or buckled rotating portion in the securing portion toward the locking portion and/or the at least one locking element has a bent or buckled region at a tip of the locking portion.

9. The connection device according to claim 1, wherein the housing has at least one additional ring-shaped inner groove for accommodating a seal between the housing and the at least one plug-in portion.

10. The connection device according to claim 1, wherein the at least one plug-in portion is secured in relation to the housing against pivoting by means of at least one positioning cam on an inner side of the housing and corresponding positioning cutouts in an end face of the at least one plug-in portion.

11. The connection device according to claim 1, wherein the housing is designed to accommodate precisely one plug-in portion or two or more plug-in portions, wherein in the second case the housing is designed as a connecting part for accommodating two opposing plug-in portions, as a T-piece, or as a multiple fitting for accommodating more than two plug-in portions.

12. The connection device according to claim 1, wherein plastics or composite materials are selected as the material for the at least one locking element and/or the at least one securing apparatus and plastics, composite materials, ceramics, glass ceramics, glasses, or metals are selected as the material for the housing and/or for the at least one plug-in portion.

13. The connection device according to claim 12, wherein the plastics comprise polyamides, wherein the plastics or the polyamides contain additives, fillers, and/or reinforcing agents.

14. The connection device according to claim 13, wherein the polyamides are selected from the group comprising polyamide 6, polyamide 66, polyamide 46, polyamide 11, polyamide 12, polyamide elastomers, polyphtalamides, partially-aromatic partially-crystalline co-polyamides, and mixtures of these polyamides.

15. The connection device according to claim 1, wherein the molded body is selected from the group comprising solid bodies, hollow bodies, closures, and lids.

* * * * *